United States Patent [19]
Driska

[11] Patent Number: 5,691,578
[45] Date of Patent: Nov. 25, 1997

[54] BATTERY-SPARING RETAIL/HOME CIRCUIT FOR A SENSOR

[75] Inventor: John Driska, Princeton Junction, N.J.

[73] Assignee: Azrak-Hamway International, Inc., New York, N.Y.

[21] Appl. No.: 721,617

[22] Filed: Sep. 26, 1996

[51] Int. Cl.$^6$ .................... H01H 47/00; H01H 9/02
[52] U.S. Cl. .................. 307/112; 307/115; 200/168 E
[58] Field of Search ..................... 323/318; 307/112, 307/113, 114, 115, 116, 117, 10.1; 200/245, 330, 83 L, 168 E; 361/24, 189, 190; 348/525, 573, 825.44; 318/468

[56] References Cited

U.S. PATENT DOCUMENTS

| | | | |
|---|---|---|---|
| 4,181,844 | 1/1980 | Moretto | 307/115 |
| 5,589,747 | 12/1996 | Utke | 318/468 |

*Primary Examiner*—Peter S. Wong
*Assistant Examiner*—Rajnikant B. Patel
*Attorney, Agent, or Firm*—Amster, Rothstein & Ebenstein

[57] ABSTRACT

A battery-sparing retail/home circuit for a sensor includes first and second switch systems in parallel. The first switch system includes a first user-operable switch for energizing a first circuit. The first user-operable switch is biased to an open orientation for opening the first circuit and movable to a closed orientation for closing the first circuit. The first user-operable switch is always operable to close the first circuit. The second switch system includes a second user-operable switch in a series circuit with a sensor-operated switch. The second user-operable switch is accessible by a user only after purchase of the retail/home circuit and is movable between an off orientation opening the series circuit and an on orientation rendering the series circuit dependent on the sensor-operated switch only.

7 Claims, 3 Drawing Sheets

FIG. 2B
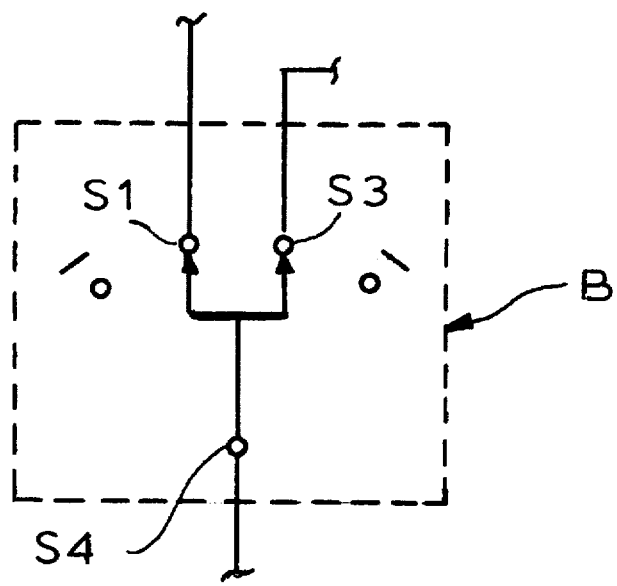
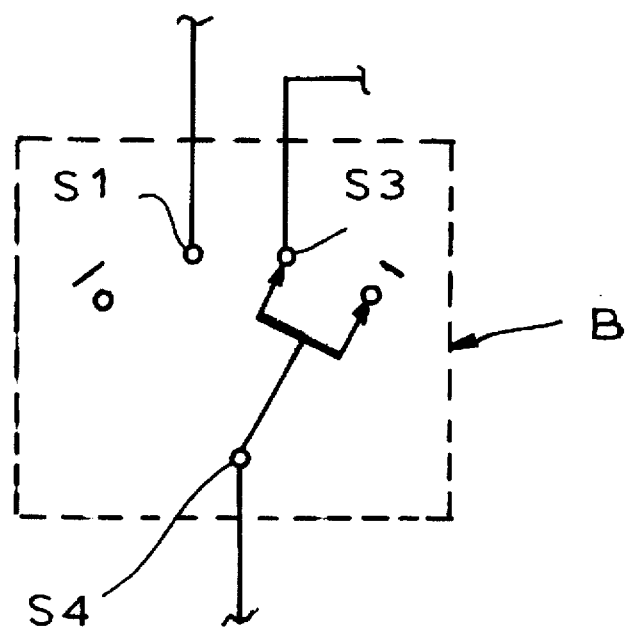
FIG. 2C

BATTERY-SPARING RETAIL/HOME CIRCUIT FOR A SENSOR

BACKGROUND OF THE INVENTION

The present invention relates to a retail/home circuit for a sensor and, in particular, such a circuit which is battery sparing because it may be actuated one way prior to purchase (i.e., in a retail environment) and another way after purchase (i.e., in a home environment).

It is a decided commercial advantage for electrical/electronic device to be operable in a "try me" mode in a retail environment prior to purchase so that the potential customer may satisfy himself that the device operates to his satisfaction. In the case of certain battery-operated devices, however, this may present a problem. For example, many toys and other products rely on a sensor, such as a motion sensor, to turn them on and off. In the case of a motion sensor in particular, it is quite obvious that—totally apart from any power drain caused by customer use of the device in the retail environment—there is likely to be a substantial power drain during the shipping process from the place of manufacture to the retail environment, as well as from the retail environment to the customer home. In view of this problem, many such devices utilize an insulative member (such as a plastic or cardboard member) which is inserted into a switch in the circuit to prevent closure of the circuit until the insulative member is removed by the customer in the home environment. However, this precludes the ability of the customer to operate the device in a "try me" mode within the retail environment, a heavy price to pay for a battery-sparing feature.

Thus, the need remains for a battery-powered device which will enable the device to be used in a "try me" mode within a retail environment and yet preclude power drain on the power supply during shipment of the device.

Accordingly, it is an object of the present invention to provide a retail/home circuit for a sensor including a first user-operable switch for use in a "try me" mode in a retail environment and a second user-operable switch which is accessible by a user only after purchase of the circuit.

Another object is to provide such a circuit which in one preferred embodiment includes a sensor-operated switch, such as a motion detector-operated switch, the status of the second user-operable switch determining whether the circuit is energizable by the first user-operable switch alone, or by it and the sensor-operated switch, or, in an especially preferred embodiment, by either one or both.

It is a further object to provide such a circuit which, in a preferred embodiment, is battery-sparing because, prior to movement of the second user-operable switch in the home environment, the power drain is possible not through the sensor-operated switch, but only through the first user-operable switch.

SUMMARY OF THE INVENTION

It has now been found that the above and related objects of the present invention are obtained in a first preferred embodiment of a battery-sparing retail/home circuit for a sensor comprising first switch means and second switch means, the first and second switch means being in parallel. The first switch means includes a first user-operable switch for energizing a first circuit. The first user-operable switch is biased to an open orientation for opening the first circuit and movable to a closed orientation for closing the first circuit. The first user-operable switch is always operable to close the first circuit. The second switch means includes a second user-operable switch in a series circuit with a sensor-operated switch. The second user-operable switch is accessible by a user only after purchase of the retail/home circuit, and is movable between an off orientation opening the series circuit and an orientation rendering the series circuit dependent on the sensor-operated switch only.

Preferably, the sensor-operated switch is a motion detector, the first user-operable switch is a pressure-sensitive switch, and the second user-operable switch is a slide switch.

The present invention also encompasses a second preferred embodiment of a battery-sparing retail/home circuit for a sensor comprising a normally open user-operable pressure-sensitive biased switch for closing a first circuit and a normally open sensor-operated switch for closing a second circuit parallel to the first circuit. A three-way switch, accessible by a user only after purchase of the retail/home circuit, is movable among a first orientation energizing the first circuit, a second orientation energizing the second circuit, and a third orientation simultaneously energizing both circuits. The three-way switch is initially in the first orientation. Preferably the sensor-operated switch is a motion detector, and the three-way switch is a rotary switch.

BRIEF DESCRIPTION OF THE DRAWING

The above and related objects, features, and advantages of the present invention will be more fully understood by reference to the following detailed description of the presently preferred, albeit illustrative, embodiments of the present invention when taken in conjunction with the accompanying drawing wherein:

FIGS. 2B and 2C are fragmentary circuit diagrams of the rotary switch of the second preferred embodiment, in alternative orientations.

DETAILED DESCRIPTION OF THE PREFERRED EMBODIMENTS

Figure 1:
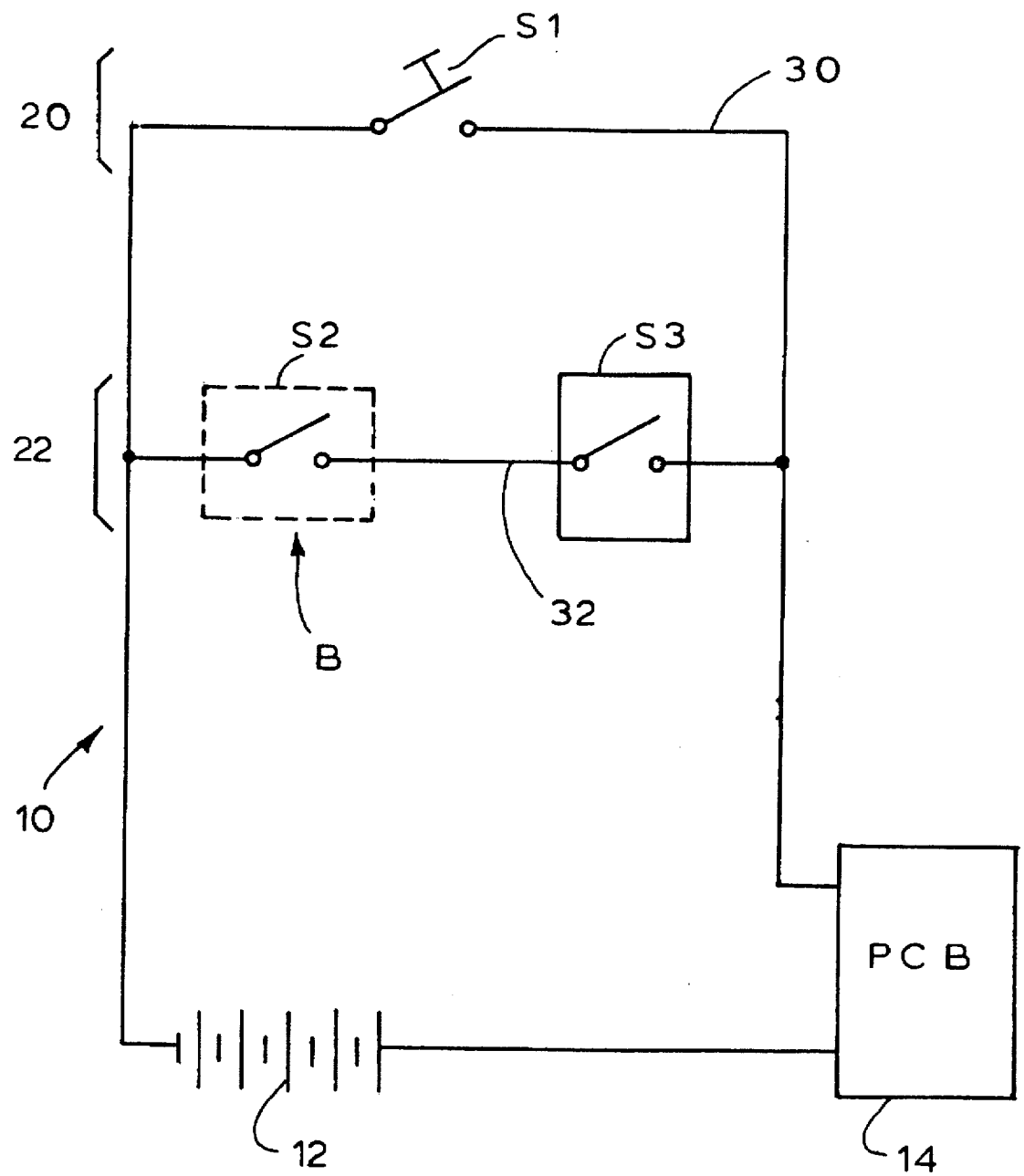
FIG. 1 is a circuit diagram of a first preferred embodiment of the present invention.

Referring now to the drawing, and in particular to FIG. 1 thereof, therein illustrated is a battery-sparing retail/home circuit for a sensor according to the present invention, generally designated by the reference numeral 10. The circuit 10 includes a power supply 12 in the nature of a battery and an output 14 illustrated as a printed circuit board. The number and type of batteries serving as the power source 12 and the nature and type of load serving as the output 14 may vary without departing from the principles of the present invention. Preferably the circuit 10 is part of a battery-powered toy, and the output 14 results in the production of aural (sound) and/or visual (light) effects.

The circuit 10 comprises in parallel a first switch means generally designated 20 and a second switch means generally designated 22. As illustrated in FIG. 1, both the first and second switch means 20, 22 are connected to the power source 12 at one end and the load 14 at the other end.

The first switch means 20 includes a first user-operable switch S1 for energizing a first circuit 30. The user-operable switch S1 is biased to an open orientation for opening the first circuit 30 (as illustrated), but manually movable to a closed orientation for closing the first circuit 30. It is always operable to close the first circuit 30. The first user-operable switch S1 is preferably a pressure-sensitive switch (illustrated as a pushbutton switch) which may easily be closed even in a retail environment (preferably while the toy containing the circuit 10 is still within its box or like packaging). The pressure required to close the first user-operable switch S1 may be adjusted so that the switch will not close under the normal pressures encountered during shipping and handling of the device. Alternatively, the packaging for the circuit may include a special recess which protects the first user-operable switch S1 from being closed, even during rough handling of the packaged circuit. The first user-operable switch S1 is a "try me" switch in that the potential customer can actuate the output 14 of the circuit 10 simply by closing the first user-operable switch S1, thereby to produce the output to be expected (e.g., typically lights and sound in a toy).

The second switch means 22 includes a second user-operable switch S2 in a series circuit 32 with a sensor-operated switch S3. As illustrated by the phantom line box B or like packaging about the second user-operable switch S2, it is accessible by a user only after purchase of the retail/home circuit 10 and the removal of the device from its box or like packaging B. In other words, the box or packaging should protect the second user-operable switch S2 from movement by a user within the retail environment.

The second user-operable switch S2, when accessible, is manually movable between an off orientation opening the series circuit 32 and an on orientation rendering the series circuit 32 dependent on the status of the sensor-operated switch S3 only. Thus, when the second user-operable switch S2 is in the off orientation (as illustrated in FIG. 1), the second circuit 32 is open regardless of the status of the sensor-operated switch S3. On the other hand, when the second user-operable switch S2 is in the on orientation, the second circuit 32 will be closed or open (i.e., energized or not energized) depending upon the status of the sensor-operated switch S3. The second user-operable switch S2 is preferably a slide switch, but may be instead a two-way rotary or other switch. It is initially set (i.e., set by the manufacturer or shipper) to the off orientation.

Thus, the retail/home circuit 10 comprises a normally open user-operable pressure-sensitive biased switch S1 for closing the first circuit 30 and a normally open sensor-operated switch S3 for closing a second or series circuit 32, parallel to the first circuit 30, only when another user-operable switch S2 is closed.

The sensor-operated switch S3 may have an on/off status which is dependent upon any of a number of variables such as time, temperature, moisture, light, or the like. Preferably the sensor-operated switch S3 is a motion detector such that motion of the device incorporating the retail/home circuit 10 turns it on. As will be appreciated by those skilled in the switch art, a motion detector switch may take the form of a ball rolling across two contacts, a pendulum switch, a leaf switch activated by a cam, or the like.

It will be appreciated that the retail/home circuit 10 illustrated in FIG. 1 enables the user in the home environment, after the second user-operable switch S2 has been closed, to energize the output 14 either through the sensor-operated switch S3 or the first user-operable switch S1. In other words, the user has two alternate ways of energizing the output 14. Thus, a price is paid for the "try me" feature in the retail environment because, in the home environment where the device is supposed to be only a motion detector (that is, the output 14 is to be energized only by motion), the device is in fact operable either through motion or through the "try me" switch S1.

Figure 2A:
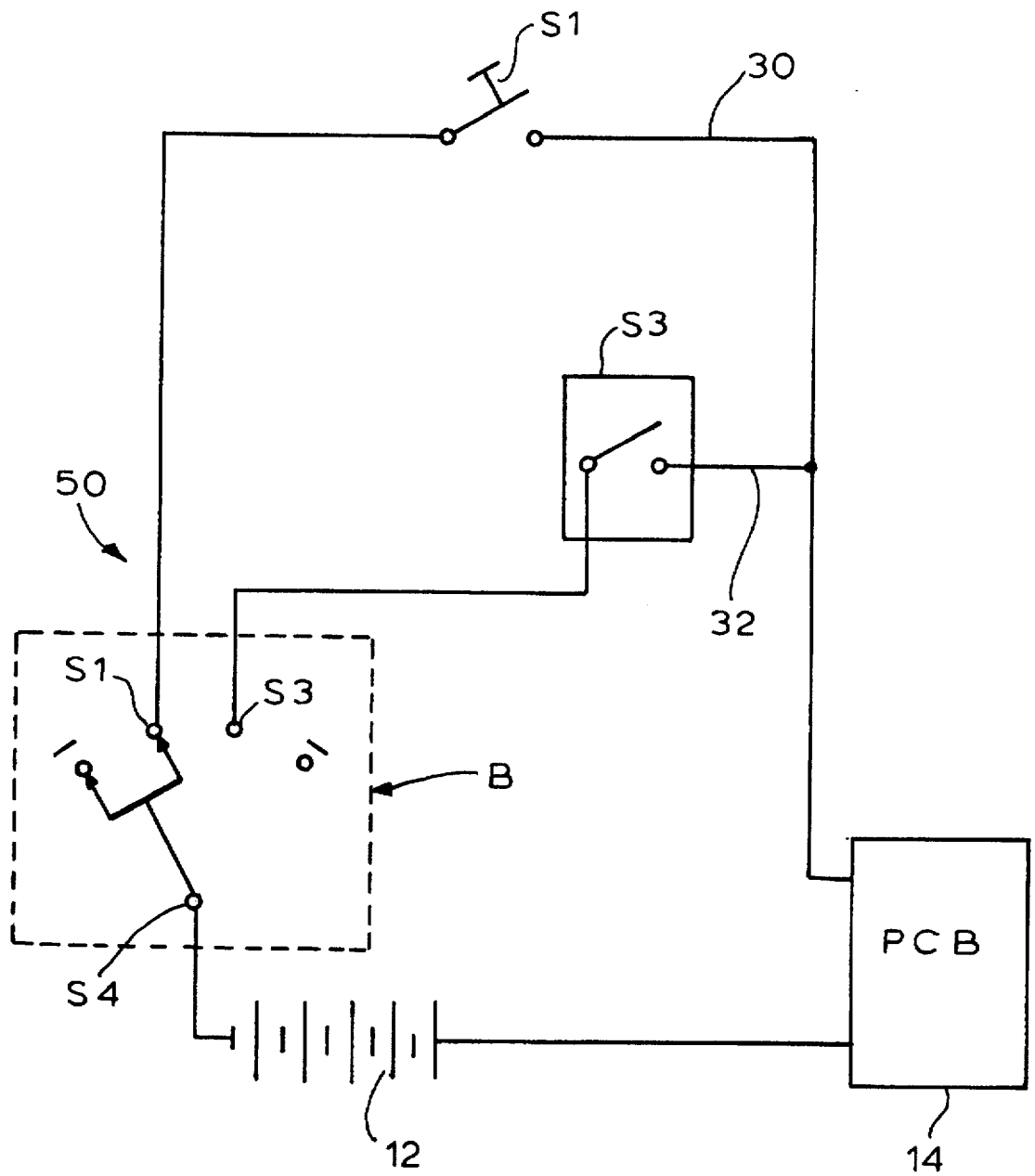
FIG. 2A is a circuit diagram of a second preferred embodiment of the present invention.

Referring now to FIGS. 2A–2C, therein illustrated is a second preferred embodiment of a retail/home circuit according to the present invention, generally designated 50. Like elements in the first and second preferred embodiments are designated by like reference numerals.

As illustrated in FIG. 2A, in the second preferred embodiment the circuit 50 is pre-set at the factory as is the circuit 10 of the first preferred embodiment (that is, for energization of the device by closure of the first user-operable switch S1 without regard to the status of the sensor-operated switch S3). This is done by movement of user-operable rotary switch S4 to the orientation illustrated in FIG. 1. As illustrated in FIG. 2B, in the second preferred embodiment 50, as in the first embodiment 10, the user-operable rotary switch S4, once accessible, can be moved to an orientation enabling actuation of the device by either the first user-operable switch S1 or the sensor-operated switch S3. However, as illustrated in FIG. 2C, in the second preferred embodiment the user-operable rotary switch S4, once accessible, may also be moved to a new orientation enabling actuation of the device only by the sensor-operated switch S3.

Thus the second user-operable switch S2 of the first embodiment 10 is eliminated, and a three-way switch, such as rotary switch S4, is employed. The three-way switch S4 is accessible by a user only after purchase of the retail/home circuit 50, and is movable among a first orientation energizing the first circuit 30 (this being the initial or factory setting illustrated in FIG. 2A), a second orientation energizing the second or series circuit 32 (illustrated in FIG. 2C), and a third orientation simultaneously energizing both circuits 30, 32 (illustrated in FIG. 2B).

The rotary three-way switch S4 has a single input and a double output. In addition to the contacts for switches S1 and S3, there are also two null contacts suitable for receiving the unnecessary one of the outputs of switch S4 without adverse effect. Thus, in FIG. 2A switch S4 energizes a null contact and the S1 contact, in FIG. 2B, the S1 and S3 contacts simultaneously, and in FIG. 2C the S3 contact and a null contact.

Thus, at the additional expense of a slightly more expensive switch S4 (relative to switch S2), the second preferred embodiment 50 provides a third mode of use (or mode of play) for the device—namely, one in which the sensor-actuated switch S3 must be activated (i.e., closed) in order to energize the output.

It will be appreciated that the box or like packaging B about the second user-operable switch—S2 in the first preferred embodiment, or S4 in the second preferred embodiment—may simply be a protective element disposed about the switch and rendering it inaccessible to the user in the retail environment.

To summarize, the present invention provides a retail/home circuit for a sensor including a first user-operable switch for use in a "try me" mode in a retail environment, and a second user-operable switch which is accessible by a user only after purchase of the circuit. In a preferred embodiment, the circuit includes a sensor-operated switch (such as a motion-detector-operated switch), the status of the second user-operable switch determining whether the circuit is energizable by the first user-operable switch alone, or by the first user-operable switch and the sensor-operated switch independently, or, in an especially preferred embodiment, by the first user-operable switch, the sensor-operated switch, or both. The circuit is battery-sparing because, prior to movement of the second user-operable switch in the home environment, a power drain is possible not through the sensor-operated switch, but only through the first user-operable switch.

Now that the preferred embodiments of the present invention have been shown and described in detail, various modifications and improvements thereon will become readily apparent to those skilled in the art. Accordingly, the spirit and scope of the present invention is to be construed broadly and limited only by the appended claims, and not by the foregoing specification.

I claim:

1. A battery-sparing retail/home circuit for a sensor comprising:
   (A) first switch means including a first user-operable switch for energizing a first circuit, said first user-operable switch being biased to an open orientation for opening the first circuit and movable to a closed orientation for closing the first circuit, said first user-operable switch always being operable to close the first circuit; and
   (B) second switch means including a second user-operable switch in a series circuit with a sensor-operated switch, said second user-operable switch being accessible by a user only after purchase of said retail/home circuit and movable between an off orientation opening the series circuit and an on orientation rendering the series circuit dependent on said sensor-operated switch only;

said first and second switch means being in parallel.

2. The circuit of claim 1 wherein said sensor operated switch is a motion detector.

3. The circuit of claim 1 wherein said first user-operable switch is a pressure-sensitive switch.

4. The circuit of claim 1 wherein said second user-operable switch is a slide switch.

5. A battery-sparing retail/home circuit for a sensor comprising:
   (A) a normally open user-operable pressure-sensitive biased switch for closing a first circuit;
   (B) a normally open sensor-operated switch for closing a second circuit parallel to said first circuit; and
   (C) a three-way switch accessible by a user only after purchase of said retail/home circuit and movable among a first orientation energizing said first circuit, a second orientation energizing said second circuit, and a third orientation simultaneously energizing both circuits, said three-way switch initially being in said first orientation.

6. The circuit of claim 5 wherein said sensor-operated switch is a motion detector.

7. The circuit of claim 5 wherein said three-way switch is a rotary switch.

* * * * *